US012658030B2

(12) United States Patent
Gao

(10) Patent No.: US 12,658,030 B2
(45) Date of Patent: Jun. 16, 2026

(54) ALARM METHOD AND DEVICE

(71) Applicant: BOE Technology Group Co., Ltd., Beijing (CN)

(72) Inventor: Weiguang Gao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 272 days.

(21) Appl. No.: 18/558,711

(22) PCT Filed: Feb. 28, 2023

(86) PCT No.: PCT/CN2023/078667
§ 371 (c)(1),
(2) Date: Nov. 2, 2023

(87) PCT Pub. No.: WO2023/179319
PCT Pub. Date: Sep. 28, 2023

(65) Prior Publication Data

US 2024/0242597 A1 Jul. 18, 2024

(30) Foreign Application Priority Data

Mar. 25, 2022 (CN) ......................... 202210306953.5

(51) Int. Cl.
*G08G 1/01* (2006.01)
*G08B 21/18* (2006.01)
*G08G 1/065* (2006.01)

(52) U.S. Cl.
CPC ......... *G08G 1/0125* (2013.01); *G08B 21/182* (2013.01); *G08G 1/065* (2013.01)

(58) Field of Classification Search
CPC ..... G08G 1/0125; G08G 1/065; G08B 21/182
(Continued)

(56) References Cited

U.S. PATENT DOCUMENTS 6,253,146 B1 * 6/2001 Hanson .............. G01C 21/3415 340/995.13
6,490,519 B1 * 12/2002 Lapidot ............ G08G 1/096775 701/119
(Continued)

FOREIGN PATENT DOCUMENTS

CN 104361750 A 2/2015
CN 107045790 A 8/2017
(Continued)

OTHER PUBLICATIONS

PCT/CN2023/078667 international search report.
(Continued)

*Primary Examiner* — Zhen Y Wu
(74) *Attorney, Agent, or Firm* — IPro, PLLC

(57) ABSTRACT

The present application provides an alarm method and device. The method includes: in response to a received alarm request, acquiring target data from a target database according to the alarm request, and determining a target processing condition and target alarm conditions according to the alarm request, where the target database includes vehicle data and road section data of at least one transportation subsystem; performing analysis and processing on the target data according to the target processing condition to obtain traffic flow information corresponding to a target road section, where the target road section is at least one road section indicated by the road section data; in response to determining that the traffic flow information meets a set of target alarm conditions, giving an alarm.

18 Claims, 5 Drawing Sheets

(58) Field of Classification Search
USPC .......................................................... 340/934
See application file for complete search history.

(56) References Cited

U.S. PATENT DOCUMENTS

| | | | | |
|---|---|---|---|---|
| 6,990,407 | B1 * | 1/2006 | Mbekeani | G08G 1/096775 340/995.13 |
| 7,511,634 | B2 * | 3/2009 | Stehle | G08G 1/0141 340/901 |
| 7,610,145 | B2 * | 10/2009 | Kantarjiev | G08G 1/0129 701/119 |
| 7,902,997 | B2 * | 3/2011 | Stehle | G08G 1/0141 340/901 |
| 8,428,856 | B2 * | 4/2013 | Tischer | G08G 1/0967 340/995.13 |
| 9,747,434 | B1 | 8/2017 | Avital | |
| 2004/0239531 | A1 * | 12/2004 | Adamczyk | G08G 1/0104 340/995.13 |
| 2006/0061486 | A1 * | 3/2006 | Luskin | G08G 1/096716 340/907 |
| 2006/0241987 | A1 * | 10/2006 | Pallotto | G06Q 50/40 705/7.12 |
| 2009/0109020 | A1 | 4/2009 | Tischer | |
| 2009/0160676 | A1 * | 6/2009 | Stehle | G06F 16/9535 340/905 |
| 2010/0273491 | A1 * | 10/2010 | Colonna | G08G 1/0104 455/456.3 |
| 2011/0034183 | A1 * | 2/2011 | Haag | H04W 4/02 455/456.3 |
| 2018/0108058 | A1 | 4/2018 | Cotton et al. | |
| 2020/0226418 | A1 * | 7/2020 | Dorai-Raj | G06F 16/248 |

FOREIGN PATENT DOCUMENTS

| | | | |
|---|---|---|---|
| CN | 109219838 | A | 1/2019 |
| CN | 109243181 | A | 1/2019 |
| CN | 111522857 | A | 8/2020 |
| CN | 112233428 | A | 1/2021 |
| CN | 112685385 | A | 4/2021 |
| CN | 113223296 | A | 8/2021 |
| CN | 113342821 | A | 9/2021 |
| CN | 114185941 | A | 3/2022 |
| CN | 114743384 | A | 7/2022 |
| KR | 20200000621 | A | 1/2020 |
| KR | 20200006738 | A | 1/2020 |
| WO | 2020034135 | A1 | 2/2020 |
| WO | 2020169052 | A1 | 8/2020 |

OTHER PUBLICATIONS

PCT/CN2023/078667 Written Opinion.
CN2022103069535 first office action.
CN2022103069535 second office action.

* cited by examiner

ALARM METHOD AND DEVICE

CROSS-REFERENCE TO RELATED APPLICATIONS

This application is a national stage of international PCT Application No. PCT/CN2023/078667 filed on Feb. 28, 2023, and claims a priority to a Chinese Patent Application with the corresponding application number being 202210306953.5 and the application date being Mar. 25, 2022, the entire contents of which are incorporated herein by reference.

TECHNICAL FIELD

The present application relates to the field of transportation technology, and in particular, to an alarm method and device.

BACKGROUND

With the development of technology, manufacturing industry has developed rapidly, and a number of products manufactured by enterprises is increasing. However, there are often abnormal products, i.e., defective products, in the products manufactured by enterprises. In order to ensure the profit of enterprises and the quality of its products, it is necessary to find causes of product abnormality, so as to make a better improvement in manufacturing.

At present, when the causes of product abnormality are found, engineers usually analyse manufacturing data of the products to determine the causes of product abnormality. However, due to the fact that this method depends on the experience of engineers for determination, its effects are poor and time efficiency is low.

SUMMARY

In order to overcome the problems existing in related art, the present application provides an alarm method and apparatus.

According to a first aspect of the present application, there is provided an alarm method, including:

in response to a received alarm request, acquiring target data from a target database according to the alarm request, and determining a target processing condition and target alarm conditions according to the alarm request, where the target database includes vehicle data and road section data of at least one transportation subsystem;

performing analysis and processing on the target data according to the target processing condition to obtain traffic flow information corresponding to a target road section, where the target road section is at least one road section indicated by the road section data; and in response to determining that the traffic flow information meets a set of target alarm conditions, giving an alarm.

The alarm request indicates a target application task identifier; the target data includes target vehicle data.

In some embodiments, acquiring the target data from the target database according to the alarm request, and determining the target processing condition and the target alarm conditions according to the alarm request includes:

acquiring vehicle data of a target transportation subsystem corresponding to the target application task identifier from the target database, where the target transportation subsystem is a data source accessed in a case of creating an application task indicated by the target application task identifier; and determining the target vehicle data according to the vehicle data of the target transportation subsystem.

In some embodiments, the target data includes target vehicle data;

performing the analysis and processing on the target data according to the target processing condition to obtain the traffic flow information corresponding to the target road section includes:

acquiring database processing statements corresponding to the target processing condition, where the database processing statements are codes pre-generated according to the target processing condition and an execution order of preset conditions; and performing corresponding analysis and processing on the target vehicle data based on the database processing statements to obtain the traffic flow information corresponding to the target road section.

In some embodiments, the target processing condition includes a filter condition, where the filter condition indicates a filter data table identifier and/or filter field information; the target data includes target vehicle data, where the target vehicle data includes a plurality of data tables;

performing the analysis and processing on the target data according to the target processing condition to obtain the traffic flow information corresponding to the target road section includes:

acquiring vehicle information corresponding to the target road section, where the vehicle information is determined according to a data table corresponding to the filter data table identifier in the target vehicle data, and/or is obtained by filtering the target vehicle data according to the filter field information; and obtaining the traffic flow information corresponding to the target road section according to the vehicle information corresponding to the target road section.

In some embodiments, the target processing condition further includes a statistical condition, where the statistical condition indicates statistical field information, and the statistical field information includes a statistical field name and a statistical field value corresponding to the statistical field name; the traffic flow information includes a set of vehicle statistical data;

obtaining the traffic flow information corresponding to the target road section according to the vehicle information corresponding to the target road section includes:

performing, based on the statistical field value, statistical processing on a field value corresponding to the statistical field name in the vehicle information corresponding to the target road section to obtain the set of vehicle statistical data corresponding to the target road section, where the statistical processing includes count processing and/or summation processing.

In some embodiments, the target processing condition further includes a sort condition, where the sort condition indicates a sort field name and a sort rule;

performing the analysis and processing on the target data according to the target processing condition to obtain the traffic flow information corresponding to the target road section includes:

performing, according to the sort rule, sort processing on a field value corresponding to the sort field name in the set of vehicle statistical data corresponding to the target road section to obtain a set of sorted vehicle statistical data, where the sort processing includes an ascending processing or a descending processing.

In some embodiments, the set of target alarm conditions includes at least one alarm condition, and the set of target alarm conditions includes an execution mode identifier, where the execution mode identifier indicates an execution mode of the alarm condition in the target alarm conditions;

determining that the traffic flow information meets the set of target alarm conditions includes:

acquiring the execution mode identifier corresponding to the set of target alarm conditions; and determining, according to the execution mode indicated by the execution mode identifier, whether the traffic flow information corresponding to the target road section meets the alarm condition in the set of target alarm conditions, and generating a determination result corresponding to the set of target alarm conditions, where the determination result indicates whether the traffic flow information meets the set of target alarm conditions.

In some embodiments, determining, according to the execution mode indicated by the execution mode identifier, whether the traffic flow information corresponding to the target road section meets the alarm condition in the set of target alarm conditions, and generating the determination result corresponding to the set of target alarm conditions includes:

in response to determining that the execution mode identifier indicates a first execution mode, sorting alarm conditions in the set of target alarm conditions in an ascending order of execution sequence numbers;

sequentially determining, according to the sorting of the alarm conditions, whether the traffic flow information meets each alarm condition;

in response to determining that the traffic flow information sequentially meets each alarm condition, determining that the determination result indicates the traffic flow information meeting the set of target alarm conditions; and in response to determining that the traffic flow information does not meet the alarm condition, determining that the determination result indicates that the traffic flow information does not meet the set of target alarm conditions.

In some embodiments, the alarm condition corresponds to one execution sequence number;

determining, according to the execution mode indicated by the execution mode identifier, whether the traffic flow information corresponding to the target road section meets the alarm condition in the set of target alarm conditions, and generating the determination result corresponding to the set of target alarm conditions includes:

in response to determining that the execution mode identifier indicates a second execution mode, sorting alarm conditions in the set of target alarm conditions in an ascending order of execution sequence numbers;

executing the alarm conditions according to the sorting of the alarm conditions; and in response to the traffic flow information meeting the executed alarm conditions, determining that the determination result indicates the traffic flow information meeting the set of target alarm conditions.

In some embodiments, determining, according to the execution mode indicated by the execution mode identifier, whether the traffic flow information corresponding to the target road section meets the alarm condition in the set of target alarm conditions, and generating the determination result corresponding to the set of target alarm conditions includes:

in response to determining that the execution mode identifier indicates a third execution mode, respectively determining whether the traffic flow information corresponding to the target road section meets each alarm condition in the set of target alarm conditions;

in response to determining that the traffic flow information meets each alarm condition, determining that the determination result indicates the traffic flow information meeting the set of target alarm conditions; and in response to determining that the traffic flow information does not meet the alarm condition, determining that the determination result indicates that the traffic flow information does not meet the set of target alarm conditions.

In some embodiments, acquiring the target data from the target database according to the alarm request includes:

acquiring an alarm time, where the alarm time is acquired from the alarm request or is set upon creating an application task corresponding to a target application task identifier indicated by the alarm request; and acquiring the target data from the target database based on the alarm time.

In some embodiments, a first page is provided through an electronic device, where the first page includes a task creation control;

the method further includes:

in response to a first triggering operation on the task creation control, creating an application task, and determining an application task identifier corresponding to the application task.

In some embodiments, a second page is provided through the electronic device, where the second page includes a data source configuration control;

the method further includes:

in response to a second triggering operation on the data source configuration control, acquiring data source configuration information corresponding to the data source configuration control;

connecting a corresponding transportation subsystem according to the data source configuration information, and establishing a corresponding relationship between the transportation subsystem and the application task identifier; and storing vehicle data and road section data from a connected transportation system data source into the target database.

In some embodiments, a third page is provided through the electronic device, where the third page includes a processing condition configuration control and a first configuration completion control;

the method further includes:

in response to a third triggering operation on the first configuration completion control, acquiring processing condition configuration information corresponding to the processing condition configuration control;

converting a format of the processing condition configuration information to obtain the processing condition configuration information in a preset data format; and determining a processing condition according to the processing condition configuration information in the preset data format, and establishing a corresponding relationship between the processing condition and the application task identifier.

In some embodiments, the processing condition configuration information includes one or more of filter condition configuration information, statistical condition configuration information, or sort condition configuration information;

the filter condition configuration information includes one or more of a filter condition identifier, filter field information, a filter mode identifier, or a filter data table identifier, where the filter field information includes one or more of a filter field name, a filter value, or a filter operator;

the statistical condition configuration information includes one or more of a statistical condition identifier, a statistical mode identifier, a statistical data table identifier, or statistical field information, where the statistical field information includes a statistical field name and/or a statistical field value; and the sort condition configuration information includes one or more of a sort condition identifier, a sort rule, or a sort field name.

In some embodiments, the method further includes:

acquiring processing condition configuration information corresponding to each processing condition corresponding to the application task identifier; and performing splice processing on the processing condition configuration information corresponding to each processing condition to generate corresponding database processing statements.

In some embodiments, a fourth page is provided through the electronic device, where the fourth page includes an alarm condition configuration control and a second configuration completion control;

the method further includes:

in response to a fourth triggering operation on the second configuration completion control, acquiring alarm condition configuration information corresponding to the alarm condition configuration control, where the alarm condition configuration information includes one or more of an alarm condition name, an alarm condition identifier, an alarm rule, an execution sequence number, or a notification target terminal identifier, where the alarm rule includes one or more of an alarm field name, an alarm threshold, or an alarm operator; and determining a corresponding alarm condition according to the alarm condition configuration information, and establishing a corresponding relationship between the alarm condition and the application task identifier.

According to a second aspect of the present application, there is provided an alarm apparatus, including:

a data acquisition module, configured to, in response to a received alarm request, acquire target data from a target database according to the alarm request, and determine target processing condition and target alarm conditions according to the alarm request, where the target database includes vehicle data and road section data of at least one transportation subsystem;

a data processing module, configured to perform analysis and processing on the target data according to the target processing condition to obtain traffic flow information corresponding to a target road section, where the target road section is at least one road section indicated by the road section data; and an alarm module, configured to, in response to determining that the traffic flow information meets a set of target alarm conditions, give an alarm.

In some embodiments, the alarm request indicates a target application task identifier; the target data includes target vehicle data;

the data acquisition module is configured to:

acquire vehicle data of a target transportation subsystem corresponding to the target application task identifier from the target database, where the target transportation subsystem is a data source accessed in a case of creating an application task indicated by the target application task identifier; and determine the target vehicle data according to the vehicle data of the target transportation subsystem.

In some embodiments, the target data includes target vehicle data;

the data processing module is configured to:

acquire database processing statements corresponding to the target processing condition, where the database processing statements are codes pre-generated according to the target processing condition and an execution order of preset conditions; and perform corresponding analysis and processing on the target vehicle data based on the database processing statements to obtain the traffic flow information corresponding to the target road section.

In some embodiments, the target processing condition includes a filter condition, where the filter condition indicates a filter data table identifier and/or filter field information; the target data includes target vehicle data, where the target vehicle data includes a plurality of data tables;

the data processing module is configured to:

acquire vehicle information corresponding to the target road section, where the vehicle information is determined according to a data table corresponding to the filter data table identifier in the target vehicle data, and/or is obtained by filtering the target vehicle data according to the filter field information; and obtain the traffic flow information corresponding to the target road section according to the vehicle information corresponding to the target road section.

In some embodiments, the target processing condition further includes a statistical condition, where the statistical condition indicates statistical field information, and the statistical field information includes a statistical field name and a statistical field value corresponding to the statistical field name; the traffic flow information includes a set of vehicle statistical data;

the data processing module is further configured to:

perform, based on the statistical field value, statistical processing on a field value corresponding to the statistical field name in the vehicle information corresponding to the target road section to obtain the set of vehicle statistical data corresponding to the target road section, where the statistical processing includes count processing and/or summation processing.

In some embodiments, the target processing condition further includes a sort condition, where the sort condition indicates a sort field name and a sort rule;

the data processing module is further configured to:

perform, according to the sort rule, sort processing on a field value corresponding to the sort field name in the set of vehicle statistical data corresponding to the target road section to obtain a set of sorted vehicle statistical data, where the sort processing includes ascending or descending processing.

In some embodiments, the set of target alarm conditions includes at least one alarm condition, and the set of target alarm conditions includes an execution mode identifier, where the execution mode identifier indicates an execution mode of the alarm condition in the target alarm conditions;

the alarm module is further configured to:

acquire the execution mode identifier corresponding to the set of target alarm conditions; and determine whether the traffic flow information corresponding to the target road section meets the alarm condition in the set of target alarm conditions according to the execution mode indicated by the execution mode identifier, and generate a determination result corresponding to the set of target alarm conditions, where the determination result indicates whether the traffic flow information meets the set of target alarm conditions.

In some embodiments, the alarm module is further configured to:

in response to determining that the execution mode identifier indicates a first execution mode, sort alarm conditions in the set of target alarm conditions in an ascending order of execution sequence numbers;

sequentially determine whether the traffic flow information meets each alarm condition according to the sorting of the alarm conditions;

in response to determining that the traffic flow information sequentially meets each alarm condition, determine that the determination result indicates the traffic flow information meeting the set of target alarm conditions; and in response to determining that the traffic flow information does not meet the alarm condition, determine that the determination result indicates that the traffic flow information does not meet the set of target alarm conditions.

In some embodiments, the alarm condition corresponds to one execution sequence number;

the alarm module is further configured to:

in response to determining that the execution mode identifier indicates a second execution mode, sort alarm conditions in the set of target alarm conditions in an ascending order of execution sequence numbers;

execute the alarm conditions according to the sorting of the alarm conditions; and in response to the traffic flow information meeting the executed alarm conditions, determine that the determination result indicates the traffic flow information meeting the set of target alarm conditions.

In some embodiments, the alarm module is further configured to:

in response to determining that the execution mode identifier indicates a third execution mode, respectively determine whether the traffic flow information corresponding to the target road section meets respective alarm conditions in the set of target alarm conditions;

in response to determining that the traffic flow information meets respective alarm conditions, determine that the determination result indicates the traffic flow information meeting the set of target alarm conditions; and in response to determining that the traffic flow information does not meet the alarm condition, determine that the determination result indicates that the traffic flow information does not meet the set of target alarm conditions.

In some embodiments, the data acquisition module is further configured to:

acquire an alarm time, where the alarm time is acquired from the alarm request or is set upon creating an application task corresponding to a target application task identifier indicated by the alarm request; and acquire the target data from the target database based on the alarm time.

In some embodiments, a first page is provided through an electronic device, where the first page includes a task creation control;

the alarm apparatus further includes a task generation module; and the task generation module is configured to:

in response to a first triggering operation on the task creation control, create an application task, and determine an application task identifier corresponding to the application task.

In some embodiments, a second page is provided through the electronic device, where the second page includes a data source configuration control; and the task generation module is further configured to:

in response to a second triggering operation on the data source configuration control, acquire data source configuration information corresponding to the data source configuration control;

connect a corresponding transportation subsystem according to the data source configuration information, and establish a corresponding relationship between the transportation subsystem and the application task identifier; and store vehicle data and road section data from a connected transportation system data source into the target database.

In some embodiments, a third page is provided through the electronic device, where the third page includes a processing condition configuration control and a first configuration completion control;

the task generation module is configured to:

in response to a third triggering operation on the first configuration completion control, acquire processing condition configuration information corresponding to the processing condition configuration control;

convert a format of the processing condition configuration information to obtain the processing condition configuration information in a preset data format; and determine a processing condition according to the processing condition configuration information in the preset data format, and establish a corresponding relationship between the processing condition and the application task identifier.

In some embodiments, the processing condition configuration information includes one or more of filter condition configuration information, statistical condition configuration information, or sort condition configuration information;

the filter condition configuration information includes one or more of a filter condition identifier, filter field information, a filter mode identifier, or a filter data table identifier, where the filter field information includes one or more of a filter field name, a filter value, or a filter operator;

the statistical condition configuration information includes one or more of a statistical condition identifier, a statistical mode identifier, a statistical data table identifier, or statistical field information, where the statistical field information includes a statistical field name and/or a statistical field value; and the sort condition configuration information includes one or more of a sort condition identifier, a sort rule, or a sort field name.

In some embodiments, the task generation module is further configured to:

acquire processing condition configuration information corresponding to each processing condition corresponding to the application task identifier; and perform splice processing on the processing condition configuration information corresponding to each processing condition to generate corresponding database processing statements.

In some embodiments, a fourth page is provided through the electronic device, where the fourth page includes an alarm condition configuration control and a second configuration completion control;

the task generation module is further configured to:

in response to a fourth triggering operation on the second configuration completion control, acquire alarm condition configuration information corresponding to the alarm condition configuration control, where the alarm condition configuration information includes one or more of an alarm condition name, an alarm condition identifier, an alarm rule, an execution sequence number, or a notification target terminal identifier, where the alarm rule includes one or more of an alarm field name, an alarm threshold, or an alarm operator; and determine a corresponding alarm condition according to the alarm condition configuration information, and establish a corresponding relationship between the alarm condition and the application task identifier.

According to a third aspect of the present application, there is provided an electronic device, including:

a processor;

a memory for storing processor executable instructions;

where the processor is configured to:

in response to a received alarm request, acquire target data from a target database according to the alarm request, and determine a target processing condition and target alarm conditions according to the alarm request, where the target database includes vehicle data and road section data of at least one transportation subsystem;

perform analysis and processing on the target data according to the target processing condition to obtain traffic flow information corresponding to a target road section, where the target road section is at least one road section indicated by the road section data; and in response to determining that the traffic flow information meets a set of target alarm conditions, give an alarm.

According to a fourth aspect of the present application, there is provided a computer readable storage medium, where computer execution instructions are stored in the computer readable storage medium, and the computer execution instructions are executed by a processor to implement the alarm method according to the first aspect and various possible designs in the first aspect.

According to a fifth aspect of the present application, there is provided a computer program product, including a computer program, where the computer program is executed by a processor to implement the alarm method according to the first aspect and various possible designs in the first aspect.

The technical solutions provided in the embodiments of the present application can include the following advantageous effects:

In the present application, the target data is determined from the target database according to the acquired alarm request, that is, desired vehicle data and other traffic data are determined, to achieve automatic data acquisition. The target processing condition and the set of target alarm conditions are determined based on the alarm request, such that corresponding analysis and processing are performed on the target data by using the target processing condition to obtain the traffic flow information corresponding to the target road section, and it is determined whether the traffic flow information corresponding to the target road section meets the set of target alarm conditions, so as to determine whether an alarm needs to be given. If the traffic flow information corresponding to the target road section meets the set of target alarm conditions, an automatic alarm is given, such that an automatic traffic flow alarm is achieved, without manual processing, which improves the efficiency of traffic flow alarms. At the same time, the target database includes vehicle data and road section data of at least one transportation subsystem, achieving data fusion of the transportation subsystem and ensuring data comprehensiveness. Therefore, the traffic flow situation of the target road section can be accurately determined based on the data in the target database, and whether an alarm needs to be given can be accurately determined based on the traffic flow situation, ensuring accuracy of traffic flow alarms.

It should be understood that the above general description and the following detailed description are only exemplary and explanatory and are not restrictive of the present application.

BRIEF DESCRIPTION OF DRAWINGS

The accompanying drawings, which are incorporated in and constitute a part of this specification, illustrate examples consistent with the present application and, together with the description, serve to explain the principle of the present application.

DETAILED DESCRIPTION

Figure 1:
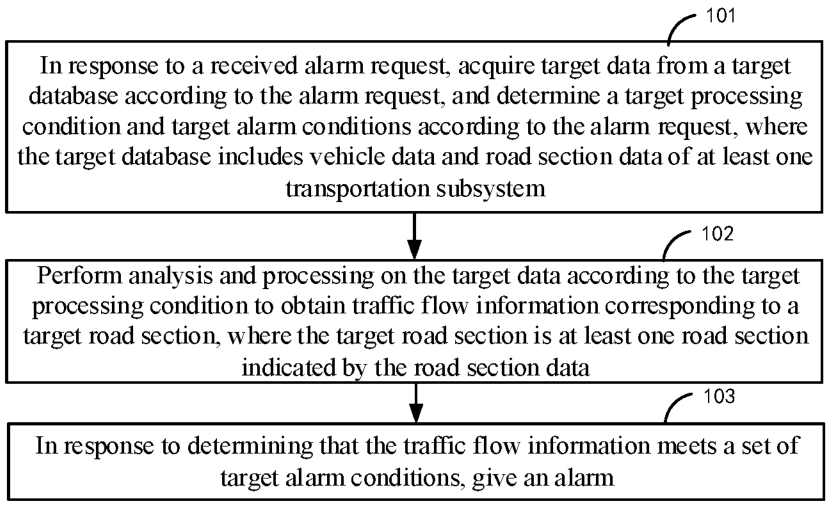
FIG. 1 is a flowchart illustrating an alarm method according to an exemplary embodiment of the present application.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present application. Rather, they are merely examples of apparatuses and methods consistent with some aspects of the present application as detailed in the appended claims.

The terms used in the present application are for the purpose of describing particular examples only, and are not intended to limit the present application. Terms determined by "a", "the" and "said" in their singular forms in the present application and the appended claims are also intended to include plurality, unless clearly indicated otherwise in the context. It should also be understood that the term "and/or" as used herein refers to and includes any and all possible combinations of one or more of the associated listed items.

It is to be understood that, although terms "first," "second," "third," and the like may be used in the present application to describe various information, such information should not be limited to these terms. These terms are only used to distinguish one category of information from another. For example, without departing from the scope of the present application, first information can be referred as second information; and similarly, second information can also be referred as first information. Depending on the context, the word "if" as used herein may be interpreted as "when" or "upon" or "in response to determining".

FIG. 1 is a flowchart illustrating an alarm method according to an exemplary embodiment of the present application. The method includes step 101 to step 103.

At step 101, in response to a received alarm request, target data is acquired from a target database according to the alarm request, and a target processing condition and target alarm conditions are determined according to the alarm request, where the target database includes vehicle data and road section data of at least one transportation subsystem.

In this embodiment, the alarm request indicates that whether the traffic flow situation of a target road section needs to be alarmed is determined. Desired traffic data is searched (or retrieved) from the target database based on the alarm request to obtain the target data, and the desired processing condition and alarm conditions are determined based on the alarm request to obtain the target processing condition and the target alarm conditions, such that the traffic flow situation corresponding to the target road section can be determined by using the target processing condition, and whether the traffic flow situation corresponding to the target road section needs to be alarmed can be determined based on the target alarm conditions.

The target database includes traffic data of at least one transportation subsystem (i.e., the vehicle data and the road section data), achieving data aggregation and fusion of the transportation subsystem, and reducing data connection cost.

The transportation subsystem is equivalent to a database. Each transportation subsystem includes traffic data corresponding to at least one type corresponding to at least one dimension. The dimension includes one or more of a vehicle type dimension, a road section type (i.e., a road type) dimension, or a time dimension, and each dimension includes at least one type. In some embodiments, the dimension can further include other types of dimensions, which are not limited here.

In some embodiments, the vehicle type dimension corresponds to at least one vehicle type. For example, the vehicle type dimension corresponds to small cars and trucks. Traffic data of a transportation subsystem 1 includes traffic data corresponding to small cars in a specified region. That is, the vehicle data in the traffic data includes only vehicle data corresponding to small cars.

In some embodiments, the road section type dimension corresponds to at least one road section type. Correspondingly, the transportation subsystem includes traffic data corresponding to a road section type. That is, the road section data in the traffic data includes only road section data corresponding to the road section type.

In some embodiments, the time dimension corresponds to at least one time period type, and each time period type indicates a time range (for example, from October 2020 to January 2021). Correspondingly, the transportation subsystem includes traffic data corresponding to a time period type, that is, traffic data collected within a time range indicated by the time period type.

In some embodiments, the data included in the transportation subsystem can be divided according to regions. That is, the transportation subsystem includes traffic data corresponding to at least one region. For example, the transportation subsystem 1 includes traffic data corresponding to a region 1, and a transportation subsystem 2 includes traffic data corresponding to a region 2.

It should be understood that the traffic data can be directly collected text data (for example, data reported by a sensor), or, be data obtained by identifying collected images (for example, data obtained by identifying images collected by cameras on a road section).

In some embodiments, the road section data includes road section information of each road section, such as location (GPS) coordinates of the road section, a road section identifier, and a road section address. The vehicle data includes basic vehicle information (such as a license plate number and a vehicle type) and travel trajectory information. The travel trajectory information includes a travel time and its corresponding travel road section. For example, if the travel time is 10:00 and its corresponding travel road section is a road section 1, it is indicated that a vehicle 1 is travelling on the road section 1 at 10:00.

In some embodiments, the target data includes target vehicle data. The target vehicle data includes a plurality of data tables. That is, the target vehicle data indicates data in the plurality of data tables.

In some embodiments, the alarm request can be input or transmitted by a user when a traffic flow alarm needs to be given, or be automatically generated, which is not limited in the present application.

At step 102, analysis and processing are performed on the target data according to the target processing condition to obtain traffic flow information corresponding to a target road section, where the target road section is at least one road section indicated by the road section data.

In this embodiment, after the target data is determined from the target database, relevant analysis and processing are performed on the target data by using the target processing condition to obtain the traffic flow information corresponding to the target road section. The traffic flow information indicates the traffic flow situation of the target road section, for example, a total number of vehicles travelling on the target road section and a number of each type of vehicles within a time period.

In some embodiments, the target processing condition includes one or more of a filter condition, a statistical condition, or a sort condition.

The filter condition indicates a filter data table identifier and/or filter field information. The target processing condition further includes a statistical condition indicating statistical field information, where the statistical field information includes a statistical field name and a statistical field value corresponding to the statistical field name. The sort condition indicates a sort field name and a sort rule.

At step 103, in response to determining that the traffic flow information meets a set of target alarm conditions, an alarm is given.

In this embodiment, after the traffic flow information corresponding to the target road section is obtained, it is determined whether the traffic flow information meets the set of target alarm conditions, so as to determine whether the traffic flow situation of the target road section meets alarm requirements. If the traffic flow information meets the set of target alarm conditions, it is indicated that the traffic flow situation of the target road section meets the alarm requirements, so as to give an alarm, which achieves an automatic traffic flow alarm.

In some embodiments, the set of target alarm conditions includes at least one alarm condition, and the set of target alarm conditions includes an execution mode identifier, where the execution mode identifier indicates an execution mode of the alarm condition in the target alarm conditions.

From the above description, it can be known that the target data is determined from the target database according to the acquired alarm request, that is, desired vehicle data and other traffic data are determined, to achieve automatic data acquisition. The target processing condition and the set of target alarm conditions are determined based on the alarm request, such that corresponding analysis and processing are performed on the target data by using the target processing condition to obtain the traffic flow information corresponding to the target road section, and it is determined whether the traffic flow information corresponding to the target road section meets the set of target alarm conditions, so as to determine whether an alarm needs to be given. If the traffic flow information corresponding to the target road section meets the set of target alarm conditions, an automatic alarm is given, such that an automatic traffic flow alarm is achieved, without manual processing, which improves the efficiency of traffic flow alarms. At the same time, the target database includes vehicle data and road section data of at least one transportation subsystem, achieving data fusion of the transportation subsystem and ensuring data comprehensiveness. Therefore, the traffic flow situation of the target road section may be accurately determined based on the data in the target database, and whether an alarm needs to be given can be accurately determined based on the traffic flow situation, ensuring accuracy of traffic flow alarms.

Figure 2:
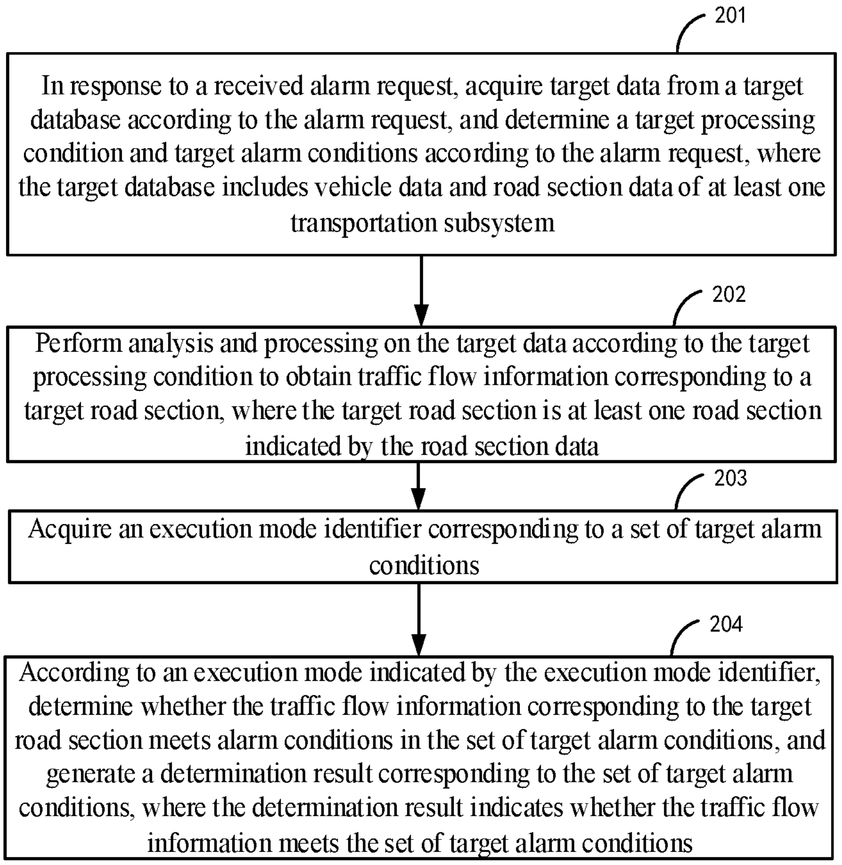
FIG. 2 is a flowchart illustrating another alarm method according to an exemplary embodiment of the present application.

FIG. 2 is a flowchart illustrating another alarm method according to an exemplary embodiment. Based on the above embodiment, in this embodiment, a process of how to determine whether a traffic flow alarm needs to be given is described. A detailed explanation of this process will be provided below in conjunction with a specific example. As shown in FIG. 2, the method includes the step 201 to step 204.

At step 201, in response to a received alarm request, target data is acquired from a target database according to the alarm request, and a target processing condition and target alarm conditions are determined according to the alarm request, where the target database includes vehicle data and road section data of at least one transportation subsystem.

In this embodiment, an application task can be preset, and is executed directly according to the alarm request, that is, a corresponding application task is scheduled to acquire corresponding data based on the application task, and it is determined whether to give a traffic flow alarm by using the data, such that an automatic alarm is achieved, which improves the efficiency of alarms. A process of executing the application task includes: the alarm request indicates a target application task identifier; vehicle data of a target transportation subsystem corresponding to the target application task identifier is acquired from the target database, where the target transportation subsystem is a data source accessed in a case of creating an application task indicated by the target application task identifier; target vehicle data is determined according to the vehicle data of the target transportation subsystem, that is, the vehicle data of the target transportation subsystem is used as the target vehicle data.

The target processing condition and the set of target alarm conditions can be determined according to the target application task identifier, that is, the processing condition corresponding to the target application task identifier is retrieved, and the retrieved processing condition is used as the target processing condition. In addition, a set of alarm conditions corresponding to the target application task identifier is retrieved, and the retrieved set of alarm conditions is used as the set of target alarm conditions.

The target transportation subsystem is a transportation subsystem corresponding to the target application task identifier, that is, the target transportation subsystem can be a transportation subsystem pre-selected from all transportation subsystems corresponding to the target database according to actual needs.

In some embodiments, the target data can be determined based on any one or more transportation subsystems corresponding to the target database, that is, vehicle data and road section data corresponding to the any one or more transportation subsystems are used as the target data. A process of how to determine the target data based on the transportation subsystems is not limited here.

In some embodiments, the alarm request can directly carry (include) the target application task identifier or carry other information that can determine an application task. For example, the alarm request includes a target road section, such that a corresponding application task can be determined according to the target road section.

In some embodiments, an alarm time is acquired. The alarm time is acquired from the alarm request or is set upon creating an application task corresponding to the target application task identifier indicated by the alarm request. The target data is acquired from the target database based on the alarm time, such that a traffic flow alarm is given by using the target vehicle data.

The alarm time can be an interval time or an execution time. When the alarm time is the interval time, the target data is acquired from the target database every alarm time, such that a traffic flow alarm is given by using the target data. That is, application tasks are executed every alarm time, achieving periodic scheduling of the application tasks and meeting requirements of users for timed alarms.

When the alarm time is the execution time, and the alarm time is reached, that is, when a current time is the alarm time, the target data is acquired from the target database, such that a traffic flow alarm is given by using the target data. That is, when the current time is the alarm time, an application task is executed, achieving a traffic flow alarm at a specific time.

In some embodiments, a first page is provided through an electronic device. The first page includes a task creation control. In response to a first triggering operation on the task creation control, an application task is created, and an application task identifier corresponding to the application task is determined.

In some embodiments, a user can create an application task according to his/her needs. When the application task needs to be created, the user performs the first triggering operation (for example, a clicking operation) on the task creation control (for example, an "addition" control in FIG. 3) of the first page. In response to the first triggering operation, the electronic device creates a corresponding application task, and assigns a corresponding application task identifier to the application task, or uses an application task identifier input by the user as the application task identifier corresponding to the application task.

Figure 3:
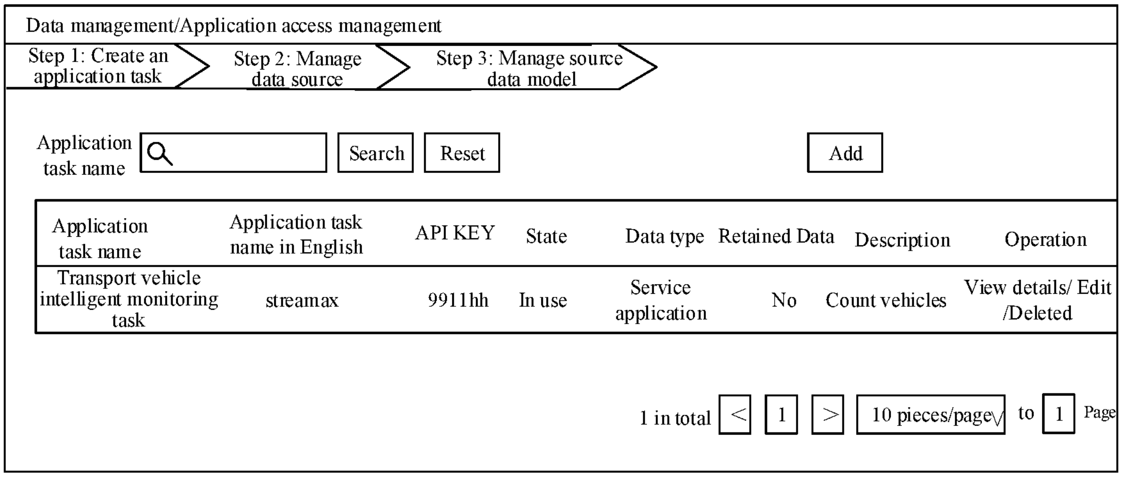
FIG. 3 is an interface schematic diagram illustrating application task configuration according to an exemplary embodiment of the present application.

The application task identifier can be a serial number, a name (such as a Chinese application name and an English application name shown in FIG. 3,), etc.

In some embodiments, when the application task is created, as shown in FIG. 3, the user can further input other information of the application task, such as a secret key (i.e., API KEY), description information, a status, a data type of the application task.

The application task can be called by other terminals. When calling the application task, other terminals need to provide the secret key of the application task.

In some embodiments, in the process of creating the application task, data used in executing the application task can be further determined. That is, a second page is provided through the electronic device. The second page includes a data source configuration control. In response to a second triggering operation on the data source configuration control, data source configuration information corresponding to the data source configuration control is acquired. A corresponding transportation subsystem is connected according to the data source configuration information, and a corresponding relationship between the transportation subsystem and the application task identifier is established. Vehicle data and road section data from a connected transportation system data source are stored into the target database.

Figure 4:
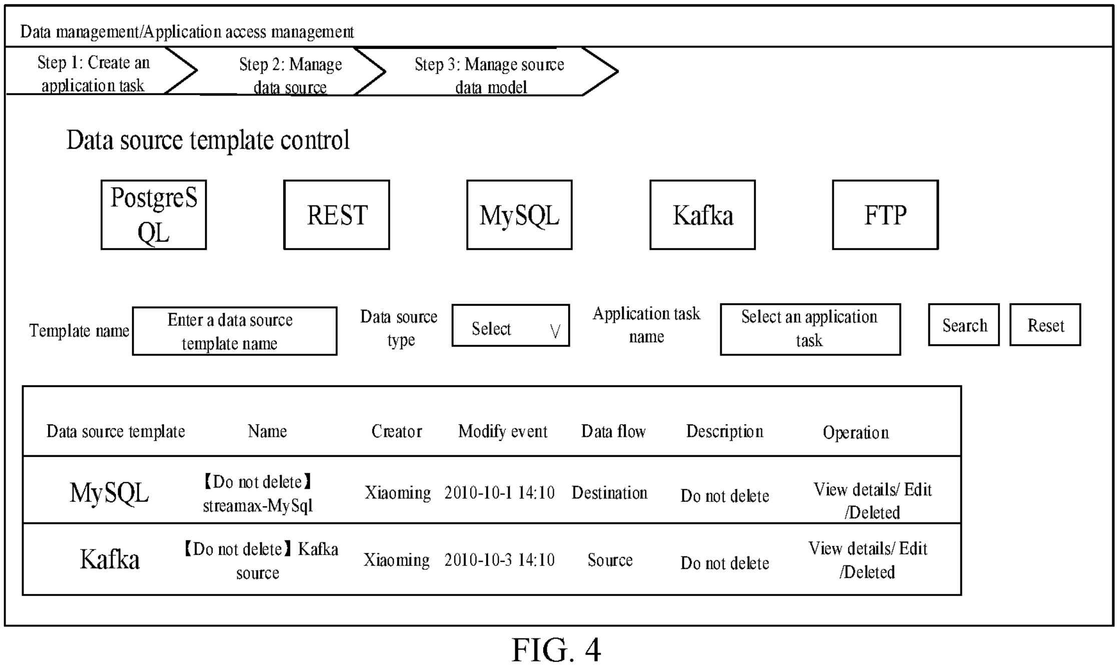
FIG. 4 is an interface schematic diagram illustrating data source configuration according to an exemplary embodiment of the present application.

In some embodiments, after the application task is created, the user can add a data source that the application task needs to use according to his/her needs. The user clicks on a data source creation control (for example, a data source template type control in FIG. 4), and the electronic device enters the second page. The user operates on the data source configuration control to obtain corresponding data source configuration information (such as a data source template, a name and a creator in FIG. 4). After the user configures the data source configuration information, the electronic device connects a corresponding transportation subsystem, i.e., the data source, based on the data source configuration information to read vehicle data and road section data in the data source, and stores the vehicle data and the road section data into the target database.

In some embodiments, the data source configuration information further includes a data source address (for example, a database address), a user name, a user password, etc. The data source address can be a network address, for example, an IP address.

In some embodiments, in the process of creating the application task, the processing condition corresponding to the application task is configured via a page that is provided through the electronic device, i.e., a third page. The third page includes a processing condition configuration control and a first configuration completion control. A process of configuring the processing condition includes: in response to a third triggering operation on the first configuration completion control, processing condition configuration information corresponding to the processing condition configuration control is acquired; a format of the processing condition configuration information is converted to obtain the processing condition configuration information in a preset data format; the processing condition is determined according to the processing condition configuration information in the preset data format, and a corresponding relationship between the processing condition and the application task identifier is established.

In some embodiments, the processing condition configuration control is used to configure information related to the processing condition. For each processing condition, the user operates on the processing condition configuration control, i.e., selects or inputs corresponding processing condition configuration information, to obtain the processing condition configuration information corresponding to the processing condition configuration control. After the user operates on the first configuration completion control, it is indicated that configuration for specific contents of the processing condition has been completed. Then, a format of processing condition configuration information corresponding to each processing condition configuration control is converted to obtain the processing condition configuration information in a preset data format. The processing condition configuration information in the preset data format is used as the processing condition, and a corresponding relationship between the processing condition and the application task identifier corresponding to the created application task is established, such that, when the application task is executed, the processing condition that need to be used can be directly determined.

In some embodiments, the processing condition includes one or more of a filter condition, a statistical condition, or a sort condition. The filter condition is used to select data; the statistical condition is used to perform statistical processing on data (such as count and summation); the sort condition is used to sort data. Correspondingly, the processing condition configuration information includes one or more of filter condition configuration information, statistical condition configuration information, or sort condition configuration information.

In some embodiments, the filter condition configuration information includes one or more of a filter condition identifier, filter field information, a filter mode identifier, or a filter data table identifier. The filter field information includes one or more of a filter field name, a filter value, or a filter operator.

In some embodiments, the filter condition identifier indicates an identifier of a filter condition. A corresponding filter condition can be retrieved through the filter condition identifier. The filter data table identifier is used to determine data that needs to be processed, i.e., the target data. A corresponding data table (i.e., a filter data table) is retrieved through the filter data table identifier, and data in the retrieved data table is desired data (i.e., the target data). The filter field information is used to select data from the filter data table. That is, data that a field value corresponding to the filter field name matches the filter value is selected from the filter data table based on the filter operator. Filter operators include >, ≥, =, <, ≤, etc.

The filter mode identifier includes a condition filter mode identifier and/or an enumeration filter mode identifier. For example, when the filter mode identifier is the condition filter mode identifier, it is indicated that filtering is performed according to configured conditions; when the filter mode identifier is the enumeration filter mode identifier, it is indicated that filtering is performed based on a preset numerical value, i.e., a filter field value.

Figure 5:
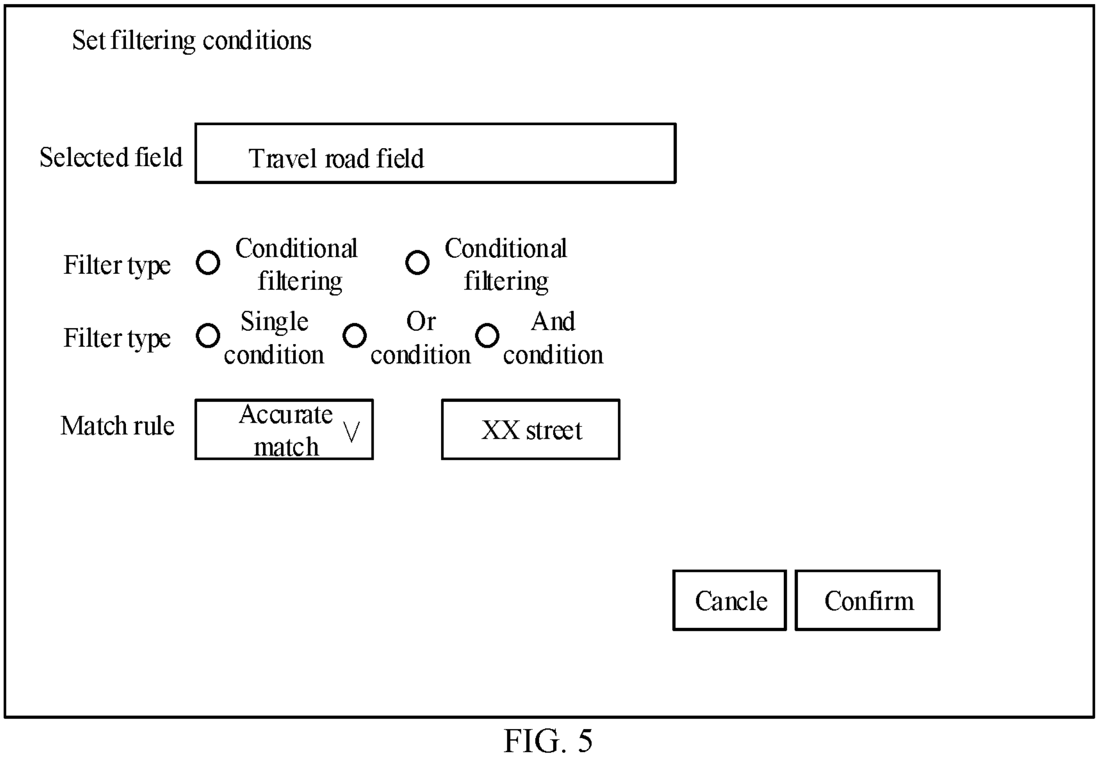
FIG. 5 is an interface schematic diagram illustrating filter condition configuration according to an exemplary embodiment of the present application.

In some embodiments, as shown in FIG. 5, when the filter condition is configured, the user can further select a form of the configured condition. When the condition is in the form of a single condition, it is indicated that a number of configured filter field names is one, and filtering is performed according to relevant information corresponding to the single filter field name (such as the filter operator and the filter value); when the condition is in the form of "or" conditions, it is indicated that a number of configured filter field names is multiple, and filtering is performed according to relevant information corresponding to any one configured filter field name; when the condition is in the form of "and" conditions, it is indicated that a number of configured filter field names is multiple, and filtering is performed according to relevant information corresponding to all configured filter field names. Correspondingly, the processing condition configuration information corresponding to the filter condition includes a condition form identifier. The condition form identifier includes one or more of a single condition identifier, an "or" condition identifier, or an "and" condition identifier.

Taking a specific application scenario as an example, the processing condition configuration information corresponding to the filter condition is: the filter data table identifier is table 1, the filter mode identifier is the condition filter mode identifier, the filter field name includes a travelling road section, the filter operator is =, the filter value corresponding to the travelling road section is "XX street", the filter field name further includes a travelling time, the filter operator is >, and the filter value corresponding to the travelling time is "time 1". The filter condition is used to select information of vehicles passing through the "XX street" within a period from the time 1 to a current time from a data table corresponding to the table 1.

In some embodiments, the statistical condition configuration information includes one or more of a statistical condition identifier, a statistical mode identifier, a statistical data table identifier, or statistical field information. The statistical field information includes a statistical field name and/or a statistical field value.

The statistical condition identifier indicates an identifier of a statistical condition. A corresponding statistical condition can be retrieved through the statistical condition identifier. The statistical mode identifier indicates a statistical mode that needs to be performed, i.e., a statistical processing identifier, and the statistical mode includes a summation mode, a count mode, etc. The statistical data table identifier is used to determine a data table where data on which statistical processing needs to be performed is located. The statistical field information is used to perform statistical processing on data in a statistical data table. For example, if the statistical condition configuration information includes the statistical data table identifier, the statistical field name is a vehicle type, the statistical field value is a small car, and the statistical mode identifier indicates the count mode, when the statistical condition is executed, a field value corresponding to the vehicle type in the statistical data table corresponding to the statistical data table identifier is acquired as a number of small cars.

In some embodiments, the sort condition configuration information includes one or more of a sort data table identifier, a sort condition identifier, a sort rule, or a sort field name. The sort data table identifier is used to determine a data table where data on which sort processing needs to be performed is located. The sort condition identifier indicates an identifier of a sort condition. A corresponding sort condition can be retrieved through the sort condition identifier. The sort rule indicates a data sort mode, and includes an ascending rule and a descending rule. For example, if the sort data table identifier is table 1, the sort rule is the ascending rule, and the sort field name is math score, data in a data table corresponding to the table 1 will be sorted in an ascending order of math scores.

In some embodiments, the preset data format can be a Json data format. The preset data format can be other formats, which are not limited here. For example, the processing condition includes a filter condition, a statistical condition, and a sort condition. When the preset data format is the Json data format, converted processing condition is data stored in the Json format. The data is:

```
{
  "id":"731",
//row: declaration fields are sorted according to dimension statistical grouping
"row":[
        {
          "name":"ppzl",//travelling time field
          "order":"ASC",//ascending
          "pathId":"public.t_app_5308_swgsvppt. ppzl",
          "remark":"",
          "caption":"null",
          "colType":"character",
          "itemType":"dimension",
          "useaggregator":""//statistical mode
        }
    ],
  //column: declaration fields as row objects for statistical processing (count,
sum)
      "column":[
        {
          "name":"ppzl",
          "order":"ASC",
          "pathId":"public.t_app_5308_swgsvppt.id",
          "remark":"",
          "caption":" xh",
          "colType":"str",
          "itemType":"measure",
          "useaggregator":"count"//statistical mode: count
        }
    ],
  //filter condition
    "filter":[
```

-continued

```
        {
          "name":" idczt",
          "order":"",
          "filter":{
            "config":{
              "joinType":"single",
              "conditions":[
                {
                  "value":"XX street",
                  "conditionValue":"="
                }
              ]
            },
            "componentType":"conditionInput" //filter according to
conditions
          },
          "pathId":"public.t_app_5308_swgsvppt.idczt",
          "remark":"",
          "caption":" idczt",
          "colType":"str",
          "itemType":"measure",
          "useaggregator":""
        }
    ].
```

Where "idczt" indicates a travelling road section, i.e., a filter field name; "value" in "conditions" indicates a filter field value; "conditionValue" indicates a filter operator; "caption" indicates a statistical field name of a Y-axis, i.e., a filter field name; "xh" indicates a vehicle type.

In some embodiments, when the processing condition is configured, field information (for example, the filter field information) needs to be used. In order to enable the user to quickly configure the processing condition, a created metadata model is selected, and desired field information is selected from displayed field information corresponding to the metadata model.

Figure 6:
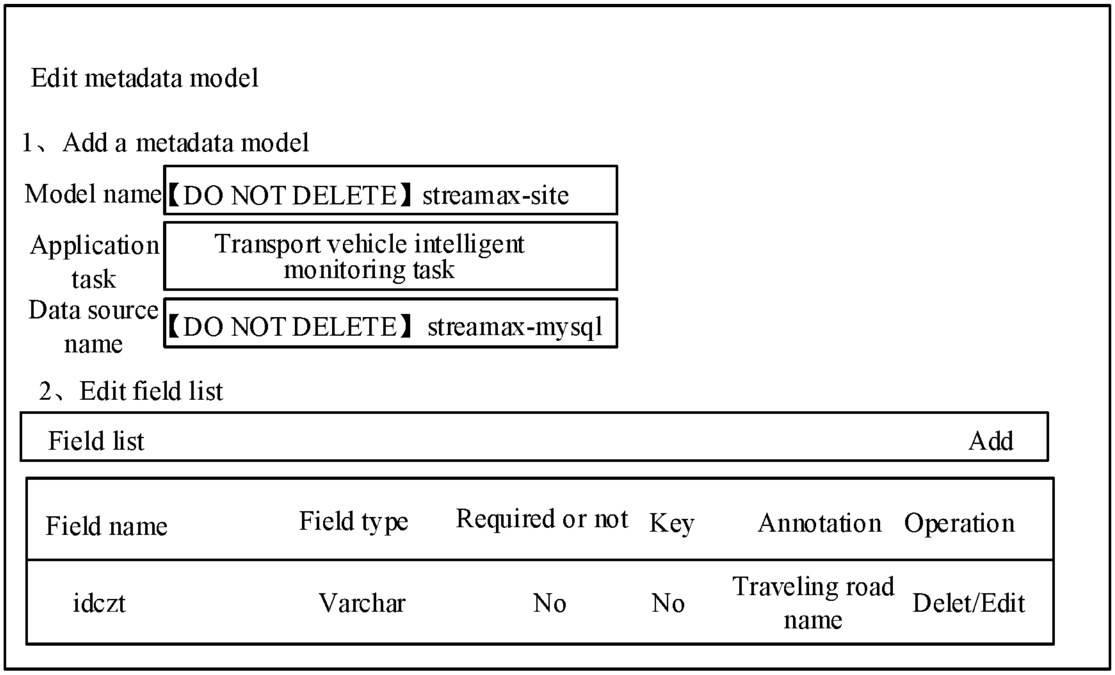
FIG. 6 is an interface schematic diagram illustrating metadata configuration according to an exemplary embodiment of the present application.

The metadata model includes field information of data in an accessed data source (i.e., a transportation subsystem), such as a field name, a field type, and an annotation as shown in FIG. 6.

In some embodiments, in the process of creating the application task, alarm conditions corresponding to the application task are configured via a page that is provided through the electronic device, i.e., a fourth page. The fourth page includes an alarm condition configuration control and a second configuration completion control. Processes of configuring the alarm conditions includes:

in response to a fourth triggering operation on the second configuration completion control, alarm condition configuration information corresponding to the alarm condition configuration control is acquired, where the alarm condition configuration information includes one or more of an alarm condition name, an alarm condition identifier, an alarm rule, an execution sequence number, or a notification target terminal identifier, where the alarm rule includes one or more of an alarm field name, an alarm threshold, or an alarm operator; a corresponding alarm condition is determined according to the alarm condition configuration information, and a corresponding relationship between the alarm condition and the application task identifier is established.

In some embodiments, the alarm condition configuration information further includes a metadata model identifier, etc.

In some embodiments, the target terminal indicates a terminal that receives alarm information. The target terminal identifier includes a target terminal address, for example, a uniform resource locator (URL) address.

In some embodiments, the alarm condition configuration control can be set according to needs. For example, a control for configuring the metadata model identifier can be a drop-down box, which enables the user to quickly select a desired metadata model identifier.

At step 202, analysis and processing are performed on the target data according to the target processing condition to obtain traffic flow information corresponding to a target road section, where the target road section is at least one road section indicated by the road section data.

In this embodiment, database processing statements corresponding to the target processing condition are acquired, where the database processing statements are codes pre-generated according to the target processing condition and an execution order of preset conditions. Corresponding analysis and processing are performed on the target vehicle data based on the database processing statements to obtain the traffic flow information corresponding to the target road section.

The execution order of preset conditions indicates an execution order of condition(s) included in the target processing condition. For example, the target processing condition includes a filter condition and a statistical condition. If the execution order of preset conditions is to firstly execute the filter condition, and then to execute the statistical condition, desired database processing statements are generated based on the target processing condition and an execution order of corresponding conditions.

In some embodiments, in order to quickly perform the analysis and processing on the target vehicle data, the database processing statements corresponding to the target processing condition are acquired, that is, when a target application task is executed, the database processing statements corresponding to the target processing condition corresponding to the target application task are acquired, and the database processing statements are executed to perform the analysis and processing on the target vehicle data, so as to obtain the traffic flow information corresponding to the target road section.

In some embodiments, when the target processing condition includes a filter condition, vehicle information corresponding to the target road section is acquired, where the vehicle information is determined according to a data table corresponding to a filter data table identifier in the target vehicle data, and/or is obtained by filtering the target vehicle data according to filter field information. The traffic flow information corresponding to the target road section is obtained according to the vehicle information corresponding to the target road section.

In some embodiments, when the filter condition in the target processing condition includes the filter data table identifier and the filter field information, the data table corresponding to the filter data table identifier is retrieved, and data is selected from the data table based on the filter field information to obtain the vehicle information corresponding to the target road section. For example, the filter field information includes a filter field name and its corresponding filter value, and a filter operator, where the filter field name includes a travelling road section, the filter operator is =, the filter value corresponding to the travelling road section is "XX street", the filter field name further includes a travelling time, the filter operator is >, and the filter value corresponding to the travelling time is "time 1". The filter condition is used to select information of vehicles passing through the "XX street" within a period from the time 1 to a current time from a data table corresponding to the table 1.

When the filter condition includes the filter data table identifier, the data in the data table corresponding to the filter data table identifier is used as the target vehicle data; when the filter condition includes the filter field information, data is selected from an accessed data source based on the filter field information.

In some embodiments, the vehicle information corresponding to the target road section indicates information of vehicles passing through the target road section, and the vehicle information includes a vehicle type, a vehicle identifier, etc. The vehicle identifier includes unique indication information such as a license plate number.

When the target processing condition includes only the filter condition, and when obtaining the vehicle information corresponding to the target road section according to the filter condition, the vehicle information corresponding to the target road section can be directly used as the traffic flow information. When the target processing condition further includes a statistical condition, statistical processing continues to be performed on the vehicle information corresponding to the target road section according to the statistical condition to obtain the traffic flow information corresponding to the target road section, where the traffic flow information includes a set of vehicle statistical data. Processes of performing the statistical processing on the vehicle information corresponding to the target road section include: statistical processing is performed on a field value corresponding to the statistical field name in the vehicle information corresponding to the target road section based on the statistical field value, that is, the field value corresponding to the statistical field name is counted or summed, to obtain the set of vehicle statistical data corresponding to the target road section. The statistical processing includes count processing and/or summation processing.

In some embodiments, the statistical condition further indicates a statistical mode identifier.

For example, when the vehicle information indicates information of vehicles travelling on the target road section, the vehicle information includes a vehicle type, and the statistical mode identifier indicated by the statistical condition is count processing. When the statistical field information indicated by the statistical condition includes a statistical field name and a statistical field value, where the statistical field name is a vehicle type, and the statistical field value is a small car, in executing the statistical condition, all values corresponding to the vehicle type are acquired from the vehicle information corresponding to the target road section, and a number of small cars is counted from the all values to obtain the number of small cars travelling on the target road section. When the statistical field information indicated by the statistical condition includes only the statistical field name, in executing the statistical condition, all values corresponding to the vehicle type are acquired from the vehicle information corresponding to the target road section, and a number of each vehicle type is counted from the all values to obtain the number of each vehicle type travelling on the target road section.

In some embodiments, when the target processing condition further includes a sort condition, it is indicated that sort processing needs to be performed on the vehicle information obtained by executing the filter condition or on the set of vehicle statistical data corresponding to the target road section obtained by executing the statistical condition. When sort processing is performed on the set of vehicle statistical data corresponding to the target road section, sort processing is performed on a field value corresponding to the sort field name in the set of vehicle statistical data corresponding to the target road section according to the sort rule to obtain a set of sorted vehicle statistical data, where the sort processing includes an ascending processing or a descending processing.

For example, if the set of vehicle statistical data includes a number of each vehicle type, the sort condition indicates an ascending rule, and the sort field name is the vehicle type, in executing the sort condition, the number of each vehicle type is ascended. The number of each vehicle type in the set of vehicle statistical data after ascending processing is arranged in an ascending order.

Figure 7:
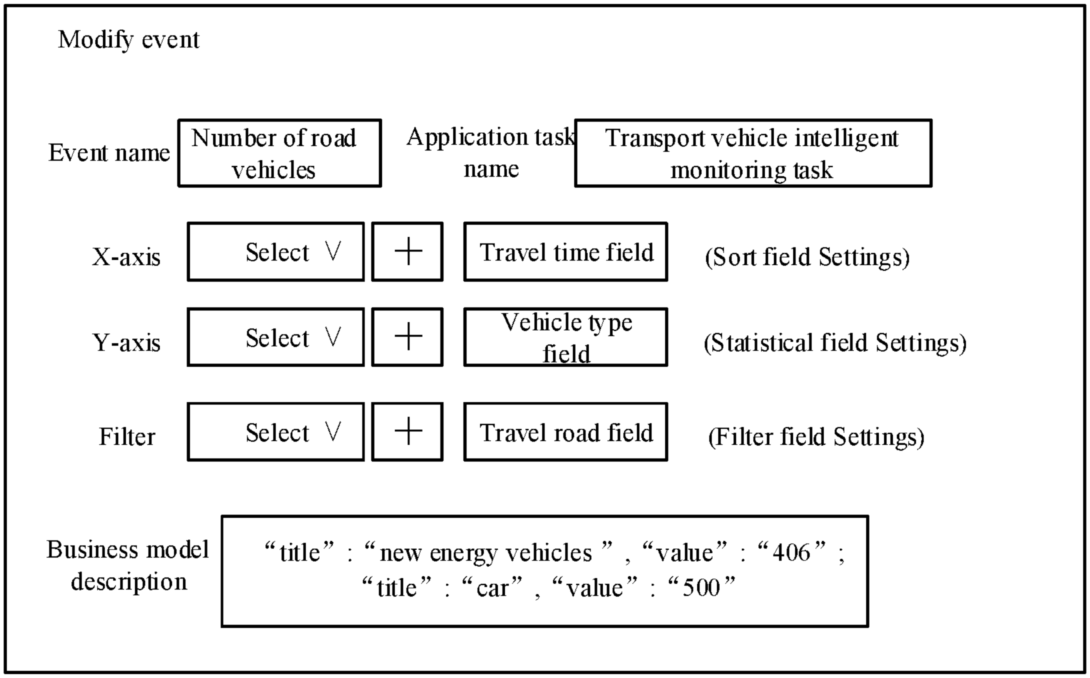
FIG. 7 is an interface schematic diagram illustrating processing data display according to an exemplary embodiment of the present application.

In some embodiments, after the target processing condition has been executed, the obtained traffic flow information corresponding to the target road section is displayed, such that the user can obtain and directly analyse a processing result. For example, as shown in FIG. 7, after the user has configured the sort field name, the statistical field name, and the filter field name corresponding to the processing condition, the set of vehicle statistical data i.e., the number of each vehicle type arranged in an ascending order, is obtained by executing the processing condition, and the set of vehicle statistical data is displayed.

In some embodiments, processing condition configuration information corresponding to each processing condition corresponding to the application task identifier is acquired. Splice processing is performed on the processing condition configuration information corresponding to each processing condition to generate corresponding database processing statements.

In some embodiments, after the processing condition configuration information corresponding to the processing condition is acquired, splice processing is performed on the processing condition configuration information corresponding to the processing condition based on a preset data format to obtain database processing statements corresponding to all processing conditions, such that, when the processing condition needs to be executed, all processing conditions can be directly executed based on the database processing statements, achieving rapid execution of the processing conditions.

For convenience of performing the splice processing, the processing condition configuration information can be processing condition configuration information in the preset data format obtained after format conversion. For example, if the processing condition configuration information in the preset data format is represented by the above codes, the database processing statements obtained by performing the splice processing is: select xh, count(xh) from t_app_5308_swgsvppt where idczt="XX street" group by xh order by ppzl asc.

At step 203, an execution mode identifier corresponding to a set of target alarm conditions is acquired.

At step 204, according to an execution mode indicated by the execution mode identifier, it is determined whether the traffic flow information corresponding to the target road section meets alarm conditions in the set of target alarm conditions, and a determination result corresponding to the set of target alarm conditions is generated, where the determination result indicates whether the traffic flow information meets the set of target alarm conditions.

In this embodiment, after the set of target alarm conditions that needs to be executed is determined based on the alarm request, the execution mode of the alarm conditions in the set of target alarm conditions is determined by using the execution mode identifier corresponding to the set of target alarm conditions, such that the alarm conditions in the set of target alarm conditions are executed based on the execution mode, that is, it is determined whether the traffic flow information corresponding to the target road section meets the alarm conditions, and further the determination result corresponding to the set of target alarm conditions is obtained.

In some embodiments, the execution mode identifier includes one or more of a first identifier, a second identifier, or a third identifier. In some embodiments, when the execution mode identifier is the first identifier, the execution mode identifier indicates a first execution mode. The first execution mode represents a sequential execution mode, that is, it is sequentially determined whether the traffic flow information corresponding to the target road section meets each alarm condition in the set of target alarm conditions.

When the execution mode identifier is the second identifier, the execution mode identifier indicates a second execution mode. The second execution mode represents an "or" execution mode, that is, when it is determined that the traffic flow information corresponding to the target road section meets one alarm condition in the set of target alarm conditions, other alarm conditions stop to be executed.

When the execution mode identifier is the third identifier, the execution mode identifier indicates a third execution mode. The third execution mode represents an "and" execution mode, that is, it is respectively determined whether the traffic flow information corresponding to the target road section meets each alarm condition in the set of target alarm conditions.

In some embodiments, the alarm condition corresponds to one execution sequence number.

In response to determining that the execution mode identifier indicates the first execution mode, alarm conditions in the set of target alarm conditions are sorted in an ascending order of execution sequence numbers. It is sequentially determined whether the traffic flow information meets each alarm condition according to the sorting of the alarm conditions. In response to determining that the traffic flow information sequentially meets each alarm condition, it is determined that the determination result indicates the traffic flow information meeting the set of target alarm conditions. In response to determining that the traffic flow information does not meet the alarm condition, it is determined that the determination result indicates that the traffic flow information does not meet the set of target alarm conditions.

In some embodiments, in response to determining that the execution mode identifier indicates the first execution mode, it is indicated that each alarm condition in the set of target alarm conditions needs to be sequentially executed in an order, that is, it is sequentially determined whether the traffic flow information corresponding to the target road section meets each alarm condition in the set of target alarm conditions, then, the alarm conditions in the set of target alarm conditions are firstly sorted in the ascending order of execution sequence numbers, and each alarm condition in the set of target alarm conditions is traversed based on the sorting of the alarm conditions. In response to determining that the traffic flow information meets a current traversed alarm condition, a next alarm condition continues to be traversed; in response to determining that the traffic flow information does not meet a current traversed alarm condition, the remaining alarm conditions stop to be traversed, and it is determined that the determination result indicates that the traffic flow information does not meet the set of target alarm conditions. When it is determined that the traffic flow information meets each alarm condition in the set of target alarm conditions, it is determined that the determination result indicates the traffic flow information meeting the set of target alarm conditions.

Taking a specific application scenario as an example, there are 3 alarm conditions in the set of target alarm conditions. An execution sequence number corresponding to an alarm condition 1 is 1, an execution sequence number corresponding to an alarm condition 2 is 3, and an execution sequence number corresponding to an alarm condition 3 is 2. The alarm conditions in the set of target alarm conditions are sorted in the ascending order of execution sequence numbers. The sorted alarm conditions are the alarm condition 1, the alarm condition 3, and the alarm condition 2. In response to determining that the execution mode identifier indicates the first execution mode, it is firstly determined whether the traffic flow information meets the alarm condition 1; after it is determined that the traffic flow information meets the alarm condition 1, it is determined whether the traffic flow information meets the alarm condition 3; after it is determined that the traffic flow information meets the alarm condition 3, it is determined whether the traffic flow information meets the alarm condition 2; after it is determined that the traffic flow information meets the alarm condition 2, it is determined that the determination result indicates the traffic flow information meeting the set of target alarm conditions.

In some embodiments, in response to determining that the execution mode identifier indicates the second execution mode, alarm conditions in the set of target alarm conditions are sorted in an ascending order of execution sequence numbers. The alarm conditions are executed according to the sorting of the alarm conditions. In response to the traffic flow information meeting the executed alarm conditions, it is determined that the determination result indicates the traffic flow information meeting the set of target alarm conditions.

In some embodiments, in response to determining that the execution mode identifier indicates the second execution mode, it is indicated that, when it is determined that the traffic flow information corresponding to the target road section meets one alarm condition in the set of target alarm conditions, other alarm conditions stop to be executed, then, the alarm conditions in the set of target alarm conditions are firstly sorted in the ascending order of execution sequence numbers, and each alarm condition in the set of target alarm conditions is traversed based on the sorting of the alarm conditions. In response to determining that the traffic flow information meets a current traversed alarm condition, the remaining alarm conditions stop to be traversed, and it is determined that the determination result indicates the traffic flow information meeting the set of target alarm conditions. When it is determined that the traffic flow information does not meet each alarm condition in the set of target alarm conditions, it is determined that the determination result indicates that the traffic flow information does not meet the set of target alarm conditions.

In some embodiments, in response to determining that the execution mode identifier indicates the third execution mode, it is respectively determined whether the traffic flow information corresponding to the target road section meets each alarm condition in the set of target alarm conditions. In response to determining that the traffic flow information meets each alarm condition, it is determined that the determination result indicates the traffic flow information meeting the set of target alarm conditions. In response to determining that the traffic flow information does not meet the alarm condition, it is determined that the determination result indicates that the traffic flow information does not meet the set of target alarm conditions.

In this embodiment, the execution mode of alarm conditions can be set according to different needs, so as to ensure diversified execution of the alarm conditions.

At step 305, in response to determining that the determination result indicates the traffic flow information meeting the set of target alarm conditions, an alarm is given.

In this embodiment, in response to determining that the determination result indicates the traffic flow information meeting the set of target alarm conditions, it is indicated that a traffic flow alarm needs to be given, then, alarm information is generated, and a target terminal identifier is acquired. The alarm information is transmitted to a target terminal based on the target terminal identifier, such that a corresponding person on the target terminal can timely obtain the traffic flow information corresponding to the target road section meeting the alarm conditions.

In this embodiment, after the traffic flow information corresponding to the target road section is acquired, the set of target alarm conditions that needs to be executed is determined, and based on the execution mode corresponding to the set of target alarm conditions, it is determined whether the traffic flow information corresponding to the target road section meets the alarm conditions in the set of target alarm conditions, and the determination result corresponding to the set of target alarm conditions is generated, such that, by using the determination result, it is determined whether a traffic flow alarm needs to be given, which enables the user to determine the execution mode of the alarm conditions according to his/her needs, meeting personalized needs of the user, and achieving flexible setting of the alarm conditions.

Corresponding to the method embodiments, the present application further provides alarm apparatus and its applied electronic device embodiments.

Figure 8:
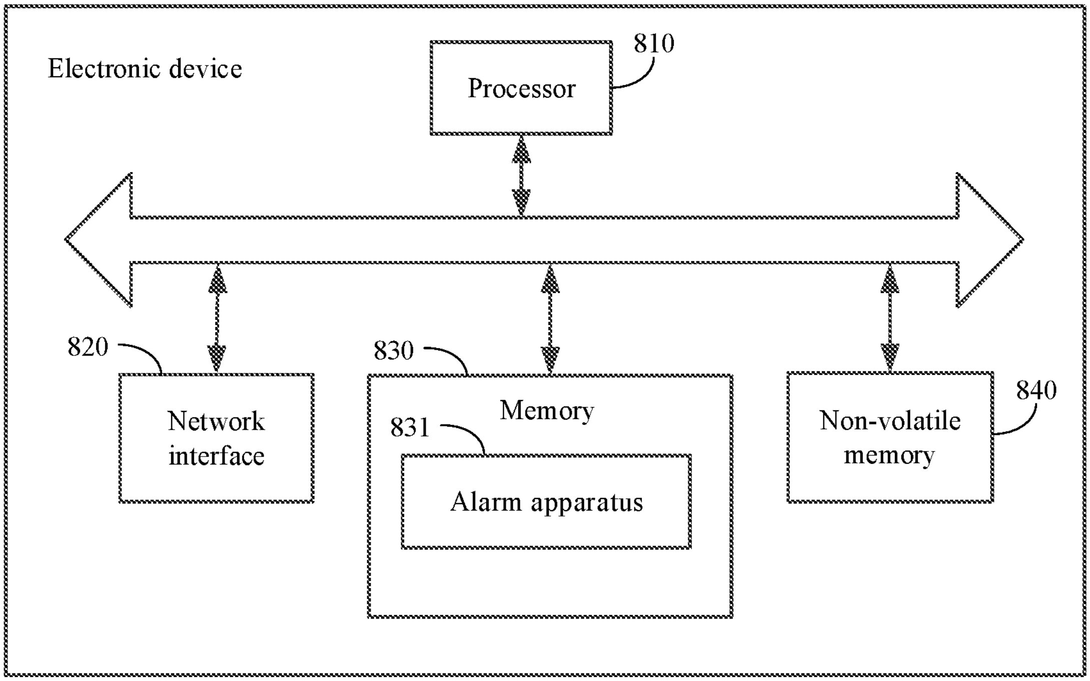
FIG. 8 is a hardware structure diagram illustrating an electronic device where the alarm apparatus in the present application is located.

The alarm apparatus embodiment in the present application can be applied to an electronic device, such as a server or a terminal device. The alarm apparatus embodiment can be implemented by software, or by hardware, or by a combination of software and hardware. Taking the software implementation as an example, as an apparatus in a logical sense, it is formed by reading corresponding computer program instructions in a non-volatile memory into internal storage for running by a processor that processes files where the apparatus is located. From a hardware perspective, as shown in FIG. 8, which is a hardware structure diagram illustrating an electronic device where the alarm apparatus in the present application is located, in addition to a processor 810, a memory 830, a network interface 820 and a non-volatile memory 840 shown in FIG. 8, the electronic device where the alarm apparatus 831 is located in the embodiment can include other hardware usually according to actual functions of the electronic device, which will not be repeated here.

Figure 9:
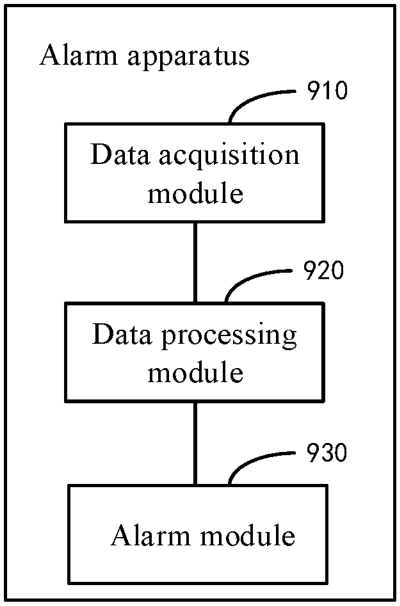
FIG. 9 is a block diagram illustrating an alarm apparatus according to an exemplary embodiment of the present application.

FIG. 9 is a block diagram illustrating an alarm apparatus according to an exemplary embodiment of the present application. The apparatus includes:

a data acquisition module 910, configured to, in response to a received alarm request, acquire target data from a target database according to the alarm request, and determine target processing condition and target alarm conditions according to the alarm request, where the target database includes vehicle data and road section data of at least one transportation subsystem;

a data processing module 920, configured to perform analysis and processing on the target data according to the target processing condition to obtain traffic flow information corresponding to a target road section, where the target road section is at least one road section indicated by the road section data;

an alarm module 930, configured to, in response to determining that the traffic flow information meets a set of target alarm conditions, give an alarm.

In some embodiments, the alarm request indicates a target application task identifier; the target data includes target vehicle data;

the data acquisition module 910 is configured to:

acquire vehicle data of a target transportation subsystem corresponding to the target application task identifier from the target database, where the target transportation subsystem is a data source accessed in a case of creating an application task indicated by the target application task identifier;

determine the target vehicle data according to the vehicle data of the target transportation subsystem.

In some embodiments, the target data includes target vehicle data;

the data processing module 920 is configured to:

acquire database processing statements corresponding to the target processing condition, where the database processing statements are codes pre-generated according to the target processing condition and an execution order of preset conditions;

perform corresponding analysis and processing on the target vehicle data based on the database processing statements to obtain the traffic flow information corresponding to the target road section.

In some embodiments, the target processing condition includes a filter condition, where the filter condition indicates a filter data table identifier and/or filter field information; the target data includes target vehicle data, where the target vehicle data includes a plurality of data tables;

the data processing module 920 is configured to:

acquire vehicle information corresponding to the target road section, where the vehicle information is determined according to a data table corresponding to the filter data table identifier in the target vehicle data, and/or is obtained by filtering the target vehicle data according to the filter field information;

obtain the traffic flow information corresponding to the target road section according to the vehicle information corresponding to the target road section.

In some embodiments, the target processing condition further includes a statistical condition, where the statistical condition indicates statistical field information, and the statistical field information includes a statistical field name and a statistical field value corresponding to the statistical field name; the traffic flow information includes a set of vehicle statistical data;

the data processing module 920 is further configured to:

perform, based on the statistical field value, statistical processing on a field value corresponding to the statistical field name in the vehicle information corresponding to the target road section to obtain the set of vehicle statistical data corresponding to the target road section, where the statistical processing includes count processing and/or summation processing.

In some embodiments, the target processing condition further includes a sort condition, where the sort condition indicates a sort field name and a sort rule;

the data processing module 920 is further configured to:

perform, according to the sort rule, sort processing on a field value corresponding to the sort field name in the set of vehicle statistical data corresponding to the target road section to obtain a set of sorted vehicle statistical data, where the sort processing includes an ascending processing or a descending processing.

In some embodiments, the set of target alarm conditions includes at least one alarm condition, and the set of target alarm conditions includes an execution mode identifier, where the execution mode identifier indicates an execution mode of the alarm condition in the target alarm conditions;

the alarm module 930 is further configured to:

acquire the execution mode identifier corresponding to the set of target alarm conditions;

determine, according to the execution mode indicated by the execution mode identifier, whether the traffic flow information corresponding to the target road section meets the alarm condition in the set of target alarm conditions, and generate a determination result corresponding to the set of target alarm conditions, where the determination result indicates whether the traffic flow information meets the set of target alarm conditions.

In some embodiments, the alarm module 930 is further configured to:

in response to determining that the execution mode identifier indicates a first execution mode, sort alarm conditions in the set of target alarm conditions in an ascending order of execution sequence numbers;

sequentially determine, according to the sorting of the alarm conditions, whether the traffic flow information meets each alarm condition;

in response to determining that the traffic flow information sequentially meets each alarm condition, determine that the determination result indicates the traffic flow information meeting the set of target alarm conditions;

in response to determining that the traffic flow information does not meet the alarm condition, determine that the determination result indicates that the traffic flow information does not meet the set of target alarm conditions.

In some embodiments, the alarm condition corresponds to one execution sequence number;

the alarm module 930 is further configured to:

in response to determining that the execution mode identifier indicates a second execution mode, sort alarm conditions in the set of target alarm conditions in an ascending order of execution sequence numbers;

execute the alarm conditions according to the sorting of the alarm conditions;

in response to the traffic flow information meeting the executed alarm conditions, determine that the determination result indicates the traffic flow information meeting the set of target alarm conditions.

In some embodiments, the alarm module 930 is further configured to:

in response to determining that the execution mode identifier indicates a third execution mode, respectively determine whether the traffic flow information corresponding to the target road section meets each alarm condition in the set of target alarm conditions;

in response to determining that the traffic flow information meets each alarm condition, determine that the determination result indicates the traffic flow information meeting the set of target alarm conditions;

in response to determining that the traffic flow information does not meet the alarm condition, determine that the determination result indicates that the traffic flow information does not meet the set of target alarm conditions.

In some embodiments, the data acquisition module 910 is further configured to:

acquire an alarm time, where the alarm time is acquired from the alarm request or is set upon creating an application task corresponding to a target application task identifier indicated by the alarm request;

acquire the target data from the target database based on the alarm time.

In some embodiments, a first page is provided through an electronic device, where the first page includes a task creation control;

the alarm apparatus further includes a task generation module;

the task generation module is configured to:

in response to a first triggering operation on the task creation control, create an application task, and determine an application task identifier corresponding to the application task.

In some embodiments, a second page is provided through the electronic device, where the second page includes a data source configuration control;

the task generation module is further configured to:

in response to a second triggering operation on the data source configuration control, acquire data source configuration information corresponding to the data source configuration control;

connect a corresponding transportation subsystem according to the data source configuration information, and establish a corresponding relationship between the transportation subsystem and the application task identifier;

store vehicle data and road section data from a connected transportation system data source into the target database.

In some embodiments, a third page is provided through the electronic device, where the third page includes a processing condition configuration control and a first configuration completion control;

the task generation module is configured to:

in response to a third triggering operation on the first configuration completion control, acquire processing condition configuration information corresponding to the processing condition configuration control;

convert a format of the processing condition configuration information to obtain the processing condition configuration information in a preset data format;

determine a processing condition according to the processing condition configuration information in the preset data format, and establish a corresponding relationship between the processing condition and the application task identifier.

In some embodiments, the processing condition configuration information includes one or more of filter condition configuration information, statistical condition configuration information, or sort condition configuration information;

the filter condition configuration information includes one or more of a filter condition identifier, filter field information, a filter mode identifier, or a filter data table identifier, where the filter field information includes one or more of a filter field name, a filter value, or a filter operator;

the statistical condition configuration information includes one or more of a statistical condition identifier, a statistical mode identifier, a statistical data table identifier, or statistical field information, where the statistical field information includes a statistical field name and/or a statistical field value;

the sort condition configuration information includes one or more of a sort condition identifier, a sort rule, or a sort field name.

In some embodiments, the task generation module is further configured to:

acquire processing condition configuration information corresponding to each processing condition corresponding to the application task identifier;

perform splice processing on the processing condition configuration information corresponding to each processing condition to generate corresponding database processing statements.

In some embodiments, a fourth page is provided through the electronic device, where the fourth page includes an alarm condition configuration control and a second configuration completion control;

the task generation module is further configured to:

in response to a fourth triggering operation on the second configuration completion control, acquire alarm condition configuration information corresponding to the alarm condition configuration control, where the alarm condition configuration information includes one or more of an alarm condition name, an alarm condition identifier, an alarm rule, an execution sequence number, or a notification target terminal identifier, where the alarm rule includes one or more of an alarm field name, an alarm threshold, or an alarm operator;

determine a corresponding alarm condition according to the alarm condition configuration information, and establish a corresponding relationship between the alarm condition and the application task identifier.

Correspondingly, the present application further provides an electronic device, including: a processor; a memory for storing processor executable instructions, where the processor is configured to:

in response to a received alarm request, acquire target data from a target database according to the alarm request, and determine a target processing condition and target alarm conditions according to the alarm request, where the target database includes vehicle data and road section data of at least one transportation subsystem;

perform analysis and processing on the target data according to the target processing condition to obtain traffic flow information corresponding to a target road section, where the target road section is at least one road section indicated by the road section data;

in response to determining that the traffic flow information meets a set of target alarm conditions, give an alarm.

In another embodiment, the present application provides a computer readable storage medium, where computer execution instructions are stored in the computer readable storage medium, and the computer execution instructions are executed by a processor to implement the alarm method as described above.

In another embodiment, the present application provides a computer program product, including a computer program, where the computer program is executed by a processor to implement the alarm method as described above.

For detailed implementation processes of functions and roles of respective modules in the apparatus, reference can be made to implementation processes of corresponding steps in the method, which will not be repeated here.

For the apparatus examples, since they basically correspond to the method examples, reference can be made to the partial description of the method examples. The apparatus examples described above are merely illustrative, where the modules described as separate components may or may not be physically separated, and the components displayed as modules may or may not be physical modules, i.e., may be located in one place or may be distributed to multiple network modules. Some or all of the modules may be selected according to actual needs to achieve the objectives of the present specification. Those of ordinary skill in the art can understand and implement the present application without any creative effort.

The specific embodiments of the present application are described above. Other embodiments are within the scope of the appended claims. In some cases, actions or steps recorded in the claims can be performed in an order different from that in the embodiments and desired results can still be achieved. In addition, processes depicted in the drawings are not necessarily required to be performed in a shown particular or consecutive order to achieve the desired results. In some embodiments, multi-task processing and parallel processing are possible or may be advantageous.

Other embodiments of the present application will be readily apparent to those skilled in the art after considering the specification and practicing the application disclosed herein. The present application is intended to cover any variations, uses, or adaptations of the present application, which follow the general principle of the present application and include common knowledge or conventional technical means in the art that are not disclosed in the present application. The specification and examples are to be regarded as illustrative only. The true scope and spirit of the present application are pointed out by the following claims.

It should be understood that the present application is not limited to the precise structures that have described and shown in the drawings, and various modifications and changes can be made without departing from the scope thereof. The scope of the application is to be limited only by the appended claims.

The above are only preferred embodiments of the present application, which are not intended to limit the application.

Any modification, equivalent replacement, improvement, etc. made within the spirit and principle of the present application shall be included in the protection scope of the application.

The invention claimed is:

1. An alarm method, comprising:

in response to a received alarm request, acquiring target data from a target database according to the alarm request, and determining a target processing condition and a set of target alarm conditions according to the alarm request, wherein the target database comprises vehicle data and road section data of at least one transportation subsystem;

performing analysis and processing on the target data according to the target processing condition to obtain traffic flow information corresponding to a target road section, wherein the target road section is at least one road section indicated by the road section data; and in response to determining that the traffic flow information meets the set of target alarm conditions, giving an alarm;

wherein the target processing condition further comprises a sort condition, wherein the sort condition indicates a sort field name and a sort rule; the traffic flow information comprises a set of vehicle statistical data;

performing the analysis and processing on the target data according to the target processing condition to obtain the traffic flow information corresponding to the target road section comprises:

performing, according to the sort rule, sort processing on a field value corresponding to the sort field name in the set of vehicle statistical data corresponding to the target road section to obtain a set of sorted vehicle statistical data, wherein the sort processing comprises an ascending processing or a descending processing.

2. The method according to claim 1, wherein the alarm request indicates a target application task identifier; the target data comprises target vehicle data;

acquiring the target data from the target database according to the alarm request, and determining the target processing condition and the set of target alarm conditions according to the alarm request comprises:

acquiring vehicle data of a target transportation subsystem corresponding to the target application task identifier from the target database, wherein the target transportation subsystem is a data source accessed in a case of creating an application task indicated by the target application task identifier; and determining the target vehicle data according to the vehicle data of the target transportation subsystem.

3. The method according to claim 1, wherein the target data comprises target vehicle data;

performing the analysis and processing on the target data according to the target processing condition to obtain the traffic flow information corresponding to the target road section comprises:

acquiring database processing statements corresponding to the target processing condition, wherein the database processing statements are codes pre-generated according to the target processing condition and an execution order of preset conditions; and performing corresponding analysis and processing on the target vehicle data based on the database processing statements to obtain the traffic flow information corresponding to the target road section.

4. The method according to claim 1, wherein the target processing condition comprises a filter condition, wherein the filter condition indicates a filter data table identifier and/or filter field information; the target data comprises target vehicle data, wherein the target vehicle data comprises a plurality of data tables;

performing the analysis and processing on the target data according to the target processing condition to obtain the traffic flow information corresponding to the target road section comprises:

acquiring vehicle information corresponding to the target road section, wherein the vehicle information is determined according to a data table corresponding to the filter data table identifier in the target vehicle data, and/or is obtained by filtering the target vehicle data according to the filter field information; and obtaining the traffic flow information corresponding to the target road section according to the vehicle information corresponding to the target road section.

5. The method according to claim 4, wherein the target processing condition further comprises a statistical condition, wherein the statistical condition indicates statistical field information, and the statistical field information comprises a statistical field name and a statistical field value corresponding to the statistical field name;

obtaining the traffic flow information corresponding to the target road section according to the vehicle information corresponding to the target road section comprises:

performing, based on the statistical field value, statistical processing on a field value corresponding to the statistical field name in the vehicle information corresponding to the target road section to obtain the set of vehicle statistical data corresponding to the target road section, wherein the statistical processing comprises count processing and/or summation processing.

6. The method according to claim 1, wherein the set of target alarm conditions comprises at least one alarm condition, and the set of target alarm conditions comprises an execution mode identifier, wherein the execution mode identifier indicates an execution mode of the alarm condition in the set of target alarm conditions;

determining that the traffic flow information meets the set of target alarm conditions comprises:

acquiring the execution mode identifier corresponding to the set of target alarm conditions; and determining, according to the execution mode indicated by the execution mode identifier, whether the traffic flow information corresponding to the target road section meets the alarm condition in the set of target alarm conditions, and generating a determination result corresponding to the set of target alarm conditions, wherein the determination result indicates whether the traffic flow information meets the set of target alarm conditions.

7. The method according to claim 6, wherein determining, according to the execution mode indicated by the execution mode identifier, whether the traffic flow information corresponding to the target road section meets the alarm condition in the set of target alarm conditions, and generating the determination result corresponding to the set of target alarm conditions comprises:

in response to determining that the execution mode identifier indicates a first execution mode, sorting alarm conditions in the set of target alarm conditions in an ascending order of execution sequence numbers;

sequentially determining, according to the sorting of the alarm conditions, whether the traffic flow information meets each alarm condition;

in response to determining that the traffic flow information sequentially meets each alarm condition, determining that the determination result indicates the traffic flow information meeting the set of target alarm conditions; and in response to determining that the traffic flow information does not meet any one alarm condition in the set of target alarm conditions, determining that the determination result indicates that the traffic flow information does not meet the set of target alarm conditions.

8. The method according to claim 6, wherein each alarm condition in the set of target alarm conditions corresponds to one execution sequence number;

determining, according to the execution mode indicated by the execution mode identifier, whether the traffic flow information corresponding to the target road section meets the alarm condition in the set of target alarm conditions, and generating the determination result corresponding to the set of target alarm conditions comprises:

in response to determining that the execution mode identifier indicates a second execution mode, sorting alarm conditions in the set of target alarm conditions in an ascending order of execution sequence numbers;

executing the alarm conditions according to the sorting of the alarm conditions; and in response to the traffic flow information meeting the executed alarm conditions, determining that the determination result indicates the traffic flow information meeting the set of target alarm conditions.

9. The method according to claim 6, wherein determining, according to the execution mode indicated by the execution mode identifier, whether the traffic flow information corresponding to the target road section meets the alarm condition in the set of target alarm conditions, and generating the determination result corresponding to the set of target alarm conditions comprises:

in response to determining that the execution mode identifier indicates a third execution mode, respectively determining whether the traffic flow information corresponding to the target road section meets each alarm condition in the set of target alarm conditions;

in response to determining that the traffic flow information meets each alarm condition, determining that the determination result indicates the traffic flow information meeting the set of target alarm conditions; or in response to determining that the traffic flow information does not meet any one alarm condition in the set of target alarm conditions, determining that the determination result indicates that the traffic flow information does not meet the set of target alarm conditions.

10. The method according to claim 1, wherein acquiring the target data from the target database according to the alarm request comprises:

acquiring an alarm time, wherein the alarm time is acquired from the alarm request or is set upon creating an application task corresponding to a target application task identifier indicated by the alarm request; and acquiring the target data from the target database based on the alarm time.

11. The method according to claim 1, wherein a first page is provided through an electronic device, wherein the first page comprises a task creation control;

the method further comprises:

in response to a first triggering operation on the task creation control, creating an application task, and determining an application task identifier corresponding to the application task.

12. The method according to claim 11, wherein a second page is provided through the electronic device, wherein the second page comprises a data source configuration control;

the method further comprises:

in response to a second triggering operation on the data source configuration control, acquiring data source configuration information corresponding to the data source configuration control;

connecting a corresponding transportation subsystem according to the data source configuration information, and establishing a corresponding relationship between the transportation subsystem and the application task identifier; and storing vehicle data and road section data from a connected transportation system data source into the target database.

13. The method according to claim 11, wherein a third page is provided through the electronic device, wherein the third page comprises a processing condition configuration control and a first configuration completion control;

the method further comprises:

in response to a third triggering operation on the first configuration completion control, acquiring processing condition configuration information corresponding to the processing condition configuration control;

converting a format of the processing condition configuration information to obtain the processing condition configuration information in a preset data format; and determining a processing condition according to the processing condition configuration information in the preset data format, and establishing a corresponding relationship between the processing condition and the application task identifier.

14. The method according to claim 13, wherein the processing condition configuration information comprises one or more of filter condition configuration information, statistical condition configuration information, or sort condition configuration information;

the filter condition configuration information comprises one or more of a filter condition identifier, filter field information, a filter mode identifier, or a filter data table identifier, wherein the filter field information comprises one or more of a filter field name, a filter value, or a filter operator;

the statistical condition configuration information comprises one or more of a statistical condition identifier, a statistical mode identifier, a statistical data table identifier, or statistical field information, wherein the statistical field information comprises a statistical field name and/or a statistical field value; and the sort condition configuration information comprises one or more of a sort condition identifier, a sort rule, or a sort field name.

15. The method according to claim 14, further comprising:

acquiring processing condition configuration information corresponding to each processing condition corresponding to the application task identifier; and performing splice processing on the processing condition configuration information corresponding to each processing condition to generate corresponding database processing statements.

16. The method according to claim 11, wherein a fourth page is provided through the electronic device, wherein the fourth page comprises an alarm condition configuration control and a second configuration completion control;

the method further comprises:

in response to a fourth triggering operation on the second configuration completion control, acquiring alarm condition configuration information corresponding to the alarm condition configuration control, wherein the alarm condition configuration information comprises one or more of an alarm condition name, an alarm condition identifier, an alarm rule, an execution sequence number, or a notification target terminal identifier, wherein the alarm rule comprises one or more of an alarm field name, an alarm threshold, or an alarm operator; and determining a corresponding alarm condition according to the alarm condition configuration information, and establishing a corresponding relationship between the alarm condition and the application task identifier.

17. An electronic device, comprising: a memory, a processor, and a computer program stored in the memory and runnable on the processor, wherein the program is executed by the processor to implement operations comprising:

in response to a received alarm request, acquiring target data from a target database according to the alarm request, and determining a target processing condition and a set of target alarm conditions according to the alarm request, wherein the target database comprises vehicle data and road section data of at least one transportation subsystem;

performing analysis and processing on the target data according to the target processing condition to obtain traffic flow information corresponding to a target road section, wherein the target road section is at least one road section indicated by the road section data; and in response to determining that the traffic flow information meets the set of target alarm conditions, giving an alarm;

wherein the target processing condition further comprises a sort condition, wherein the sort condition indicates a sort field name and a sort rule; the traffic flow information comprises a set of vehicle statistical data;

performing the analysis and processing on the target data according to the target processing condition to obtain the traffic flow information corresponding to the target road section comprises:

performing, according to the sort rule, sort processing on a field value corresponding to the sort field name in the set of vehicle statistical data corresponding to the target road section to obtain a set of sorted vehicle statistical data, wherein the sort processing comprises an ascending processing or a descending processing.

18. A non-volatile computer readable storage medium, wherein computer execution instructions are stored in the computer readable storage medium, and the computer execution instructions are executed by a processor to implement operations comprising:

in response to a received alarm request, acquiring target data from a target database according to the alarm request, and determining a target processing condition and a set of target alarm conditions according to the alarm request, wherein the target database comprises vehicle data and road section data of at least one transportation subsystem;

performing analysis and processing on the target data according to the target processing condition to obtain traffic flow information corresponding to a target road section, wherein the target road section is at least one road section indicated by the road section data; and in response to determining that the traffic flow information meets the set of target alarm conditions, giving an alarm;

wherein the target processing condition further comprises a sort condition, wherein the sort condition indicates a sort field name and a sort rule; the traffic flow information comprises a set of vehicle statistical data;

performing the analysis and processing on the target data according to the target processing condition to obtain the traffic flow information corresponding to the target road section comprises:

performing, according to the sort rule, sort processing on a field value corresponding to the sort field name in the set of vehicle statistical data corresponding to the target road section to obtain a set of sorted vehicle statistical data, wherein the sort processing comprises an ascending processing or a descending processing.

* * * * *